United States Patent [19]

Huisman

[11] 4,197,357

[45] Apr. 8, 1980

[54] MAGNETIC RECORDING ELEMENT IN WHICH A SALT OF AN AMINE AND A PHOSPHORIC ACID ESTER ARE USED AS A DISPERSION AGENT

[75] Inventor: Hendrikus F. Huisman, Oosterhout, Netherlands

[73] Assignee: U.S. Philips Corporation, New York, N.Y.

[21] Appl. No.: 860,702

[22] Filed: Dec. 15, 1977

[30] Foreign Application Priority Data

Dec. 21, 1976 [NL] Netherlands .......................... 7614182

[51] Int. Cl.$^2$ ............................................. H01F 1/26
[52] U.S. Cl. ................................ 428/539; 252/62.51; 252/62.54; 428/411; 428/900
[58] Field of Search ...................... 428/411, 539, 900; 260/924, 925, 951, 944; 252/62.51 R, 62.54

[56] References Cited

U.S. PATENT DOCUMENTS

| | | | |
|---|---|---|---|
| 3,284,360 | 11/1966 | Peshin | 428/900 X |
| 3,471,415 | 10/1969 | Friedman | 260/23.7 R |
| 3,647,539 | 3/1972 | Weber | 428/900 X |
| 3,689,317 | 9/1972 | Akashi et al. | 428/900 X |
| 3,692,884 | 9/1972 | Gaskell | 260/944 |
| 4,070,522 | 1/1978 | Ogasa et al. | 428/539 |

*Primary Examiner*—Harold Ansher
*Attorney, Agent, or Firm*—Norman N. Spain

[57] ABSTRACT

An improved magnetic recording composition employing as a novel dispersion agent a salt of an amine and a mono- or diester of phosphoric acid with a higher olefinic alcohol or alkoxylated derivatives of the same.

5 Claims, No Drawings

MAGNETIC RECORDING ELEMENT IN WHICH A SALT OF AN AMINE AND A PHOSPHORIC ACID ESTER ARE USED AS A DISPERSION AGENT

The invention relates to a magnetic recording element which is provided with a carrier having a recording medium provided thereon.

The carrier is usually manufactured from plastics, for example polyester or polyvinyl chloride but may alternatively consist of paper, glass or metal. The carrier may have the form of a tape, plate, disk and the like.

The magnetic recording medium comprises a binder in which magnetizable particles are finely distributed by using a dispersion agent.

In order to obtain a good recording density and hence a faithful reproduction or recording of signals, it is of great importance that the magnetizable particles should be dispersed optimally in the binder.

The dispersion agents conventionally used for this purpose are to be distinguished into two groups, namely the low-molecular and high-molecular dispersion agents. The low-molecular agents, for example, the natural product lecithin, have the drawback that an excess is necessary to fully cover the particles to be dispersed. Extra substances have to be added so as to counteract migration of said excess. It is furthermore difficult to find out whether the extra substances produce the desired immobilising effect. This said addition of extra substances, for example a drying oil, is described inter alia in the U.S. Pat. No. 3,471,415.

The high-molecular dispersion agents, for example, as described in the Netherlands Pat. Application No. 65.11015 laid open to public inspection, have the drawback that, due to their poor wetting properties, agglomerates of particles are also covered with dispersion agent. It is very difficult, or possible only by the use of much energy, to disintegrate said agglomerates to individual particles.

Netherlands Pat. No. 85,823 filed in the name of Applicants suggests mono- or diphosphoric acid esters of alcohols as dispersion agents. These substances have the drawback that they are moisture-sensitive, that they can hydrolyze the binder, and that they furthermore react with certain types of magnetizable particles, for example, with magnetizable iron oxide. Furthermore, the particles to be dispersed should have acid-binding properties.

Netherlands Pat. Application No. 73,13596 laid open to public inspection discloses a two-components dispersion agent which may comprise mono- and diesters of phosphoric acid in addition to alkylaryl sulphonic acids. In this case also the same drawbacks apply as above with respect to Netherlands Pat. No. 85,823.

U.S. Pat. No. 3,692,884 proposes dispersion agents for magnetizable particles or pigment in a recording medium which are described as amine salts of phosphoric acid esters, i.e. esters derived from aliphatic, cyclic or aromatic alcohols or combinations thereof. The dispersion agents do not show an optimum tolerance with respect to the binder, that is to say, no optimum incorporation of the pigment covered with dispersion agent in the binder matrix, which results in a reduction of the electromagnetic quality of the recording medium.

Applicants have now developed a recording element of the kind mentioned in the preamble which does not exhibit the above-mentioned drawbacks and which is characterized in that the dispersion agent is a salt of an amine and a mono- and/or diester of phosphoric acid with a higher alcohol or alkyl phenol which can be alkoxylated.

The electromagnetic properties of the recording element according to the invention are excellent so that a faithful recording or reproduction of signals is possible. More in particular, the acid sensitivity of the dispersion agent used in the recording medium is reduced considerably. Furthermore, the rheological character of the binder with the magnetizable particles dispersed therein, hence of the dispersion, is improved namely in that the dispersion is less viscous and less thixotropic. All these improved characteristics result in an optimum degree of distribution of the particles in the binder and hence in a better electromagnetic quality of the recording medium present in the recording element according to the invention.

Suitable mono- and/or diesters of phosphoric acid are those in which the phosphoric acid is esterified with a higher alcohol or alkylphenol which contain 12–22 carbon atoms and are ethoxylated with 0–30 ethoxy groups. It is quite possible to use other alkoxy groups instead of ethoxy groups, for example propoxy groups, in which it should be realized that, for example, a propoxy group is slightly more hydrophobic than an ethoxy group.

Examples of the above readily usable alcohols are higher aliphatic and olefinic alcohols such as oleyl alcohol, lauryl alcohol, stearyl alcohol.

Particularly good results are obtained with esters of phosphoric acids which correspond to the formula

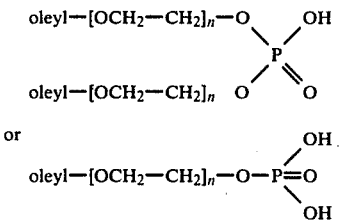

wherein n has the value 0–20 and in particular has the value 5–18.

The amine present in the dispersion agent is an organic compound having at least 3 carbon and which comprises one or more primary, secondary or tertiary amino groups. It will be obvious from this definition that amines of a variety of structures can be used. In order to illustrate this, the following examples of usable amines are given: aliphatic and olefinic amines having a lower alkyl radical, such as linoleylamine, oleylamine, laurylamine, palmitylamine, stearylamine, amylamine and coconutfat amine, heterocyclic amines, for example morpholine and morpholine substituted with alkyl, compounds which contain per molecule several amino groups, such as hexamethylene tetramine, aromatic amines such as alkyl-substituted aniline and furthermore tertiary amines, such as triethylamine, trioctylamine and triethanolamine.

Very suitable amines are the above-mentioned aliphatic and olefinic amines of which the alkyl group contains 12–22 carbon atoms as well as triethanolamine.

The wide freedom of choice of both the phosphoric acid ester and the amine has for its result that the composition of the dispersion agent is varied, of course within the limits as defined hereinbefore and in Claim 1.

This variation makes it possible to influence the properties of the dispersion agent, for example the effect of the dispersion agent on the rheologic behaviour of the magnetic dispersion. For example, those skilled in the art can prepare a dispersion agent by a suitable choice of a phosphoric acid ester and an amine which satisfies specific requirements imposed by them and which furthermore has the advantages as stated above.

Applicants have achieved good results in particular with dispersion agents consisting of salts of triethanolamine, oleylamine or coconutfat amine with phosphoric acid esters which correspond to the above formulae.

An extra advantage is obtained surprisingly if the dispersion agent contains an excess of amine, that is a larger quantity of amine than is necessary to form a salt with the phosphoric acid ester. It has been found that a dispersion agent of such a composition will also fulfill the function of a lubricant. This results in the obvious practical advantage that migration, if any, of the dispersion agent which normally has a detrimental influence on the quality of the recording medium, is no longer a drawback but is on the contrary quite advantageous for the transport and detrition properties of the carrier with the recording medium provided thereon. The quantity of dispersion agent in the magnetic recording medium is not restricted to narrow limits and will as a rule be 1–10% by weight calculated on the quantity of magnetizable particles. 2–5% by weight are preferably used.

The dispersion agents used in the recording element according to the invention are new.

The invention also relates to these new dispersion agents, as well as to methods of manufacturing said substances.

These substances can be obtained according to methods which are known per se for the synthesis of similar substances or are analogous thereto.

For example, these substances can be obtained by treating a mono- and/or diester of phosphoric acid with a higher alcohol or alkylphenol which can be alkoxylated with at least an equivalent quantity of an amine.

The phosphoric acid ester starting product can be prepared, for example, by treating the higher alcohol or alkylphenol which may be alkoxylated by reaction with an alkylene oxide, with phosphorus pentoxide. The reaction is carried out in the presence of a solvent, such as a hydrocarbon, for example toluene.

The binders to be used in the recording element according to the invention are of the conventional nature. Examples of suitable binders are, for example, polyvinyl chloride, polyvinyl acetate, polyacrylates, polyester, polyester amides, polyurethanes and copolymers of at least two monomers selected from the group consisting of vinyl chloride, vinyl acetate, acrylonitrile, vinyl alcohol, vinyl butyral and vinylidene chloride. Readily usable binders are in particular polyurethanes and partially hydrolized copolymers of vinyl chloride and vinyl acetate.

The magnetizable particles present in the binder are also of the usual type. As magnetizable particles may be used, for example: Fe Powder, $Fe_2O_3$ particles and $CrO_2$ particles.

The particles are generally acicular and have a length of 0.1–1$\mu$ and a thickness of 0.01–0.2 $\mu$.

In addition to the magnetizable particles and the dispersion agent, other ancillary substances may be dissolved or dispersed in the binder, for example a lubricant. Useful lubricants are, for example, oleic acid, mineral oils, fatty acid amides or mixtures thereof.

The preparation of the recording medium may be carried out in the usual manner, for example, by thoroughly mixing the magnetizable particles, the dispersion agent and a part of the binder in a solvent for the binder by means of a ball mill. The remainder of the binder is dissolved in a suitable solvent and the lubricant is then added and the whole is ground for another few hours in the ball mill. As solvents for the binder there may be used organic liquids, such as esters, for example ethyl acetate, ethers for example, tetrahydrofuran, ketones, such as methyl ketone and chlorinated hydrocarbons, for example 1,2-dichloroethane.

After thoroughly grinding the dispersion in the ball mill, the larger magnetizable particles possibly present are sieved out and the mixture is provided on the carrier in a uniform layer. As noted above, the carrier may be in the form of a tape, plate, disk and the like and, dependent on the material from which the carrier is manufactured, may possibly be provided with a suitable adhesive layer for the recording medium to be provided on the carrier. In addition to the adhesive layer, other layers may be provided, for example an antistatic layer. The assembly is then dried, the solvent evaporating and a recording layer remaining on the carrier in a thickness of 2 to 10 $\mu$m.

In order to promote the resistance to detrition, said layer of recording medium may be hardened, if desired, and in addition be subjected to a calendering process in which the surface of the layer becomes smoother.

The invention will be illustrated with reference to the following examples.

EXAMPLES

1. Preparation of Dispersion Agent.

A few drops of concentrated hydrochloric acid are added to a while stirring solution of 267 g of oleyl alcohol in dry toluene. A solution of 220 g of ethylene oxide in dry toluene is then added dropwise at room temperature. When everything has been added, stirring is continued for approximately another hour. The solvent is evaporated and the resulting reaction product, an ethoxylated oleyl alcohol containing 5 ethylene oxide groups per molecule, is examined by means of a gel permeation chromatograph and tested for purity. Dependent on the added quantity of ethylene oxide, oleyl alcohols having, for example, 8, 10, 15 and 20 ethylene oxide groups, can be prepared in the same manner. 710 g of phosphorous pentoxide are then added to a solution of the above-mentioned ethoxylated oleyl alcohol in toluene while stirring continuously. After complete dissolution of the oxide, stirring is continued for another hour. The reaction mixture is then poured in a large quantity of water. The organic layer is separated and dried with anhydrous $MgSO_4$. The solvent is then removed by evaporation. The resulting reaction product is a mixture of mono- and diphosphoric acid esters of ethoxylate oleyl alcohol. In the same manner, the above-mentioned ethoxylated oleyl alcohol with different numbers of ethylene oxide groups as well as oleyl alcohol itself can be converted into the phosphoric acid esters. The neuralization equivalent of the resulting phosphoric acid esters of ethoxylated oleyl alcohol has then been determined after which the esters are neutralized with an amine, for example triethylanolamine, coconutfat amine and oleylamine.

The resulting amine salts of the phosphoric acid esters of ethoxylated oleyl-alcohol are employed as dispersion agents in the recording element according to the following example 2.

2. Preparation of Magnetic Recording Element.

A magnetic recording medium was prepared by bringing the following ingredients into a pearl mill which contains 600 glass pearls having a diameter of 1–2 mm: 100 parts by weight of γ-FE$_2$O$_3$ particles 3 parts by weight of a dispersion agent consisting of the salt of coconutfat amine and phosphoric acid ester of ethoxylated oleyl alcohol containing 5 ethylene oxide groups per molecule.

30 parts by weight of a partially hydrolized copolymer of vinyl chloride and vinyl acetate. (Marketed by Union Carbide under the trade name VAGH).
2.5 parts by weight of an acetonitrile rubber (Marketed by Union Carbide under the trade name HYCAR).
7.5 parts by weight of solid acid ester (softener)
250 parts by weight of a mixture (1:1) of methylisobutylketone and toluene.

The mixture of ingredients is mixed completely for 2 to 3 hours while rotating at a high speed in the pearl mill. The resulting recording medium is then passed through a filter having a mesh width of 3μ and provided on a polyester foil having a thickness of 12 μ. After drying and calendering, a recording element was obtained in which the carrier (polyester foil) is provided with a recording medium having a layer thickness of approximately 5 microns.

In the same manner a series of magnetic recording elements were manufactured (magnetic tapes) which differed from each other only in the choice of the dispersion agent used in the recording medium.

With each of the manufactured tapes the usual electromagnetic standard measurements were performed. The results of these measurements are recorded in the following table in column 3. The measurements comprise a determination of the maximum output level at 333 Hz and 3% distortion; saturation 8 kHz; relative tape sensitivity at 333 Hz and 10 kHz; bias noise. The result of each measurement is compared with that of a DIN standard reference tape, the difference being expressed in αB's. The sum of the αB differences of all tests is recorded in column 3 under the heading ER (electroacoustical response). This ER value represents a full picture of the electroacoustical properties of the tape. A higher ER-value means a higher (better) level of electroacoustical properties.

In column 2 the composition of the magnetic tape is stated by stating the dispersion agent used.

| Tape ref. Nr. | Dispersion agent | ER-value |
|---|---|---|
| 1 | salt of oleylamine and phosphoric acid ester of oleyl alcohol | +2.2 |
| 2 | salt of coconutfatamine and phosphoric acid ester of oleyl alcohol with 5 ethylene oxide groups | +3.6 |
| 3 | salt of oleylamine and phosphoric acid ester of oleyl alcohol with 5 ethylene oxide groups | +2.8 |
| 4 | salt of triethanolamine and phosphoric acid ester of oleyl alcohol with 5 ethylene oxide groups | +5.1 |
| 5 | salt of coconutfatamine and phosphoric acid ester of oleyl alcohol with 8 ethylene oxide groups | +3.1 |
| 6 | salt of oleylamine and phosphoric acid ester of oleyl alcohol with 8 ethylene oxide groups | +3.8 |
| 7 | salt of triethanolamine and phosphoric acid ester of oleyl alcohol with 8 ethylene oxide groups | +5.4 |
| 8 | salt of coconutfatamine and phosphoric acid ester of oleyl alcohol with 10 ethylene oxide groups | +5.2 |
| 9 | salt of oleylamine and phosphoric acid ester of oleyl alcohol with 10 ethylene oxide groups | +4.1 |
| 10 | salt of triethanolamine and phosphoric acid ester of oleyl alcohol with 10 ethylene oxide groups | +5.9 |
| 11 | salt of coconutfatamine and phosphoric acid ester of oleyl alcohol with 15 ethylene oxide groups | +4.5 |
| 12 | salt of oleylamine and phosphoric acid ester of oleyl alcohol with 15 ethylene oxide groups | +4.2 |
| 13 | salt of triethanolamine and phosphoric acid ester of oleyl alcohol with 15 ethylene oxide groups | +3.7 |
| 14 | salt of coconutfatamine and phosphoric acid ester of oleyl alcohol with 20 ethylene oxide groups | +4.2 |
| 15 | salt of oleylamine and phosphoric acid ester of oleyl alcohol with 20 ethylene oxide groups | +3.8 |
| 16 | salt of triethanolamine and phosphoric acid ester of oleyl alcohol with 20 ethylene oxide groups | +5.0 |
| A | soja-lecithine | +1.8 |

It is to be noted that in the magnetic tape having reference number A a very usual and known dispersion agent is used, namely soja-lecithine. Upon playing back, said tape showed "squeel" which did not occur in other tapes.

By the addition of extra amine (10–20% of the quantity of amine required for neutralization) the coefficient of friction of the tapes was reduced from approximately 0.30 to approximately 0.20.

What is claimed is:

1. In a magnetic recording element comprising a carrier containing a dispersion agent and finely distributed magnetizable particles, the improvement wherein the dispersion agent is a salt of an amine and a mono- and/or diester of phosphoric acid with a olefinic alcohol of 12–22 of carbon atoms or with an alkoxylated derivative of said olefinic alcohol.

2. The magnetic recording element of claim 1 wherein the alcohol is ethoxylated with up to 30 ethoxy groups.

3. The magnetic recording element of claim 2 wherein the phosphoric acid ester is of the formulae

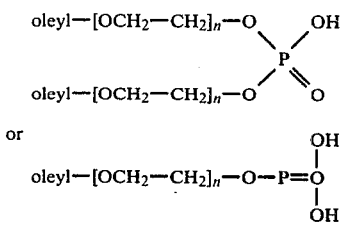
or
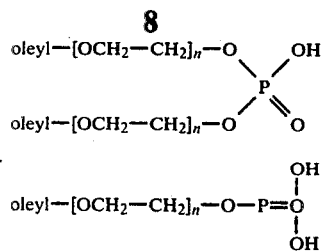
wherein n=5—18.
4. The magnetic recording element of claim 2 wherein the amine contains at least 3 carbon atoms and has one or more primary, secondary or tertiary amino groups.
5. The magnetic recording element of claim 2 wherein the dispersion agent contains an excess of the amine.
* * * * *

UNITED STATES PATENT OFFICE
CERTIFICATE OF CORRECTION

Patent No. 4,197,357  Dated April 8, 1980

Inventor(s) HENDRIKUS F. HUISMAN

It is certified that error appears in the above-identified patent and that said Letters Patent are hereby corrected as shown below:

Col 6, line 6, After "12-22" delete "of"

Col 8, Delete entire column.

Signed and Sealed this

Thirteenth Day of January 1981

[SEAL]

*Attest:*

SIDNEY A. DIAMOND

*Attesting Officer*  *Commissioner of Patents and Trademarks*